(12) United States Patent
Jacobson

(10) Patent No.: US 10,208,818 B2
(45) Date of Patent: Feb. 19, 2019

(54) APPARATUS HAVING AUTOMATIC CENTRIFUGAL BRAKES FOR WHEELS

(71) Applicant: Caterpillar Inc., Peoria, IL (US)

(72) Inventor: Evan E. Jacobson, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 43 days.

(21) Appl. No.: 15/354,694

(22) Filed: Nov. 17, 2016

(65) Prior Publication Data

US 2018/0135708 A1 May 17, 2018

(51) Int. Cl.
*F16D 51/12* (2006.01)
*F16D 59/00* (2006.01)
*F16D 59/02* (2006.01)

(52) U.S. Cl.
CPC .............. *F16D 59/00* (2013.01); *F16D 51/12* (2013.01); *F16D 59/02* (2013.01)

(58) Field of Classification Search
CPC .......... F16D 59/00; F16D 51/12; F16D 43/24; F16D 43/18; F16D 43/22; F16D 59/02
See application file for complete search history.

(56) References Cited

U.S. PATENT DOCUMENTS

| | | | | |
|---|---|---|---|---|
| 1,998,172 A | * | 4/1935 | Ross | F16D 43/24 192/103 C |
| 2,826,935 A | * | 3/1958 | Beier | F16H 15/52 475/186 |
| 3,208,571 A | * | 9/1965 | Bochory | F16D 43/18 192/105 CD |
| 3,960,034 A | | 6/1976 | Hintergraber | |
| 4,171,029 A | | 10/1979 | Beale | |
| 4,195,721 A | * | 4/1980 | Shea | F16D 43/22 188/184 |
| 4,254,854 A | * | 3/1981 | St. John | F16D 43/18 188/184 |
| 8,157,074 B2 | * | 4/2012 | Harada | F16D 43/18 192/103 B |
| 2010/0018823 A1 | * | 1/2010 | Melz | F16D 28/00 192/40 |
| 2013/0238213 A1 | | 9/2013 | Jensen | |

FOREIGN PATENT DOCUMENTS

CN 203627648 U 6/2014

* cited by examiner

*Primary Examiner* — Pamela Rodriguez
(74) *Attorney, Agent, or Firm* — Oblon, McClelland, Maier & Neustadt

(57) ABSTRACT

An apparatus including a shaft, a wheel cylindrically mounted on the shaft, a cylinder coaxial with the wheel and having an inner wall, and at least two centrifugal braking assemblies mounted on the wheel uniformly distributed in a circumferential direction is provided. Each centrifugal braking assembly includes a brake member pivotally mounted on the wheel and having at least one curved friction surface, a cam pivotally mounted on the wheel and in slidable contact with the brake member, and a spring connected between the cam and a pin mounted on the wheel. The brake member, the cam, and the spring cooperate to rotate the curved friction surface of the brake member and in turn, contact with the inner wall of the cylinder when a rotational speed of the shaft exceeds a first predetermined value.

20 Claims, 4 Drawing Sheets

APPARATUS HAVING AUTOMATIC CENTRIFUGAL BRAKES FOR WHEELS

TECHNICAL FIELD

The present disclosure relates to flywheels, and more particularly to an automatic centrifugal brake for controlling a rotational speed of a flywheel.

BACKGROUND

In the last few decades, use of energy storage systems for ensuring an optimum utilization of energy in machines has gained widespread popularity. Such energy storage systems may store energy in one or more rotating flywheels that are being accelerated or decelerated by a connected motor or a generator. The stored energy may then be utilized for operating a machine in a cost-effective manner.

However, in case of over-speeding of an engine, the flywheels that are made of steel may break into large ballistic pieces. In order to mitigate this problem, regulatory authorities, such as the Society of Automotive Engineers (SAE) have established certain qualification standards of survival for a flywheel. For example, a flywheel is considered fit to be used in the machines only if the flywheel may operate at 2.5 times a rated rotational speed. However, in order to operate at 2.5 times the rated rotational speed, the flywheel has to be designed to withstand 6.25 times a normal design stress, considering that the stress in the flywheel increases in proportion to the square of the rotational speed of the flywheel. Such limitations hamper designing and manufacturing of the flywheels and therefore affect the energy storing capabilities of the flywheels.

SUMMARY OF THE DISCLOSURE

In one aspect of the present disclosure, an apparatus is provided. The apparatus includes an engine, a device having at least one cylindrical section having an inner wall with an inner diameter, a rotatable shaft operatively connected to the engine, journaled within and coaxial with the at least one cylindrical section of the device, a wheel having an outer diameter concentrically mounted on the shaft, wherein the inner diameter of the at least one cylindrical section of the device is greater than the outer diameter of the wheel, and at least two centrifugal braking assemblies mounted on the wheel uniformly distributed in the circumferential direction, wherein each centrifugal braking assembly includes a brake member pivotally mounted on the wheel at a proximal end and having at least one curved friction surface at a distal end, a cam pivotally mounted on the wheel at a first end and in slidable contact with the brake member, and a spring connected between a second end of the cam and a pin mounted on the wheel, and wherein the brake member, cam and spring cooperate to rotate the curved friction surface of the brake member into contact with the inner wall of the at least one cylindrical section of the device when a rotational speed of the shaft exceeds a first predetermined value.

In another aspect of the present disclosure, an apparatus is provided. The apparatus includes a shaft, a wheel having an outer diameter concentrically mounted on the shaft, and a cylinder coaxial with the wheel and having an inner wall with an inner diameter. The inner diameter of the cylinder is greater than the outer diameter of the wheel. The apparatus includes at least two centrifugal braking assemblies mounted on the wheel uniformly distributed in the circumferential direction. Each centrifugal braking assembly includes a brake member pivotally mounted on the wheel at a proximal end and having at least one curved friction surface at a distal end and a cam pivotally mounted on the wheel at a first end and in slidable contact with the brake member. Each centrifugal braking assembly further includes a spring connected between a second end of the cam and a pin mounted on the wheel. The brake member, the cam, and the spring cooperate to rotate the curved friction surface of the brake member into contact with the inner wall of the cylinder when a rotational speed of the shaft exceeds a first predetermined value.

In yet another aspect of the present disclosure, an apparatus is provided. The apparatus includes a shaft, a wheel having an outer diameter concentrically mounted on the shaft, and a cylinder coaxial with the wheel and having an inner wall with an inner diameter. The inner diameter of the cylinder is greater than the outer diameter of the wheel. The apparatus also includes at least two centrifugal braking assemblies mounted on the wheel uniformly distributed in the circumferential direction. Each centrifugal braking assembly includes a brake member pivotally mounted on the wheel at a proximal end and having at least one curved friction surface at a distal end, and a cam pivotally mounted on the wheel at a first end and in slidable contact with the brake member. The apparatus further includes a spring ring for connecting cams of the at least two centrifugal braking assemblies. The brake members, the cams, and the spring ring cooperate to rotate curved friction surfaces of the brake members into contact with the inner wall of the cylinder when a rotational speed of the shaft exceeds a first predetermined value.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
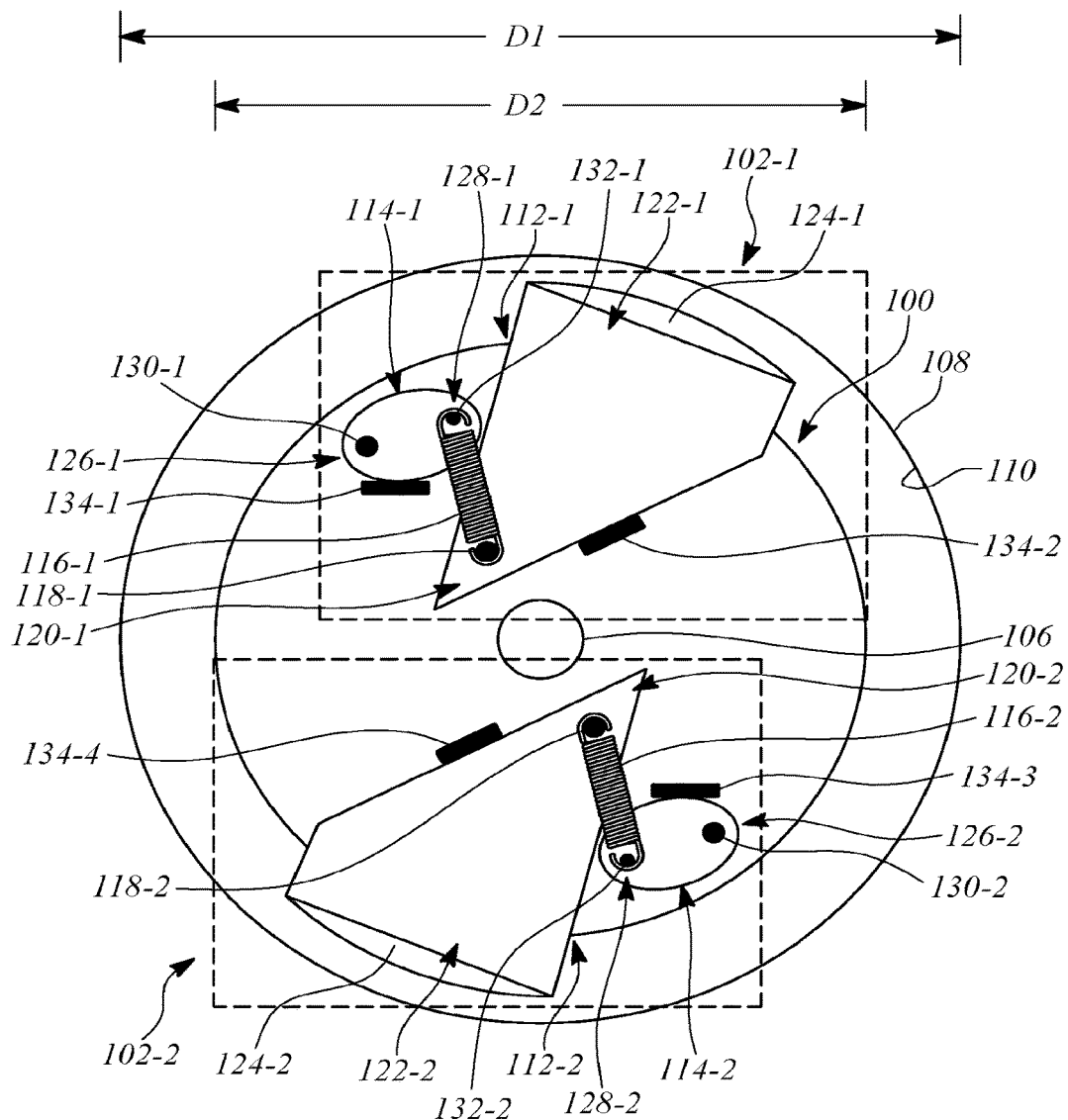
FIG. 1 is a schematic view of a wheel with automatic centrifugal brakes in a first operational mode, according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more." Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the present disclosure may provide an apparatus having a flywheel. In addition to the flywheel, some embodiments of the apparatus may include at least one transmission device operably coupled to the flywheel that may include a wheel (or disk) with at least two automatic centrifugal brakes mounted on or within it. The wheel may be concentrically mounted on a shaft. Each automatic centrifugal brake may include a brake member having at least one curved friction surface, a cam in slidable contact with the brake member, and a spring connecting the cam with a pin mounted on the flywheel. The brake member, the cam, and the spring may cooperate to rotate the curved friction surface into contact with a cylinder coaxial with the wheel, when a rotational speed of the shaft exceeds a first predetermined value. Therefore, a rotational speed of the flywheel may be controlled, reducing a possibility of failure of the flywheel due to over-speeding.

FIG. 1 illustrates a schematic view of a wheel 100 with at least two automatic centrifugal brakes 102 in a first operational mode, according to one or more embodiments of the present disclosure. In one embodiment, the at least two automatic centrifugal brakes 102 may interchangeably be referred to as "automatic centrifugal brakes 102" and "centrifugal braking assemblies 102", without departing from the scope of the present disclosure. In one embodiment, the centrifugal braking assemblies 102 may individually be referred to as "centrifugal braking assembly 102-1" and "centrifugal braking assembly 102-2".

Figure 3:
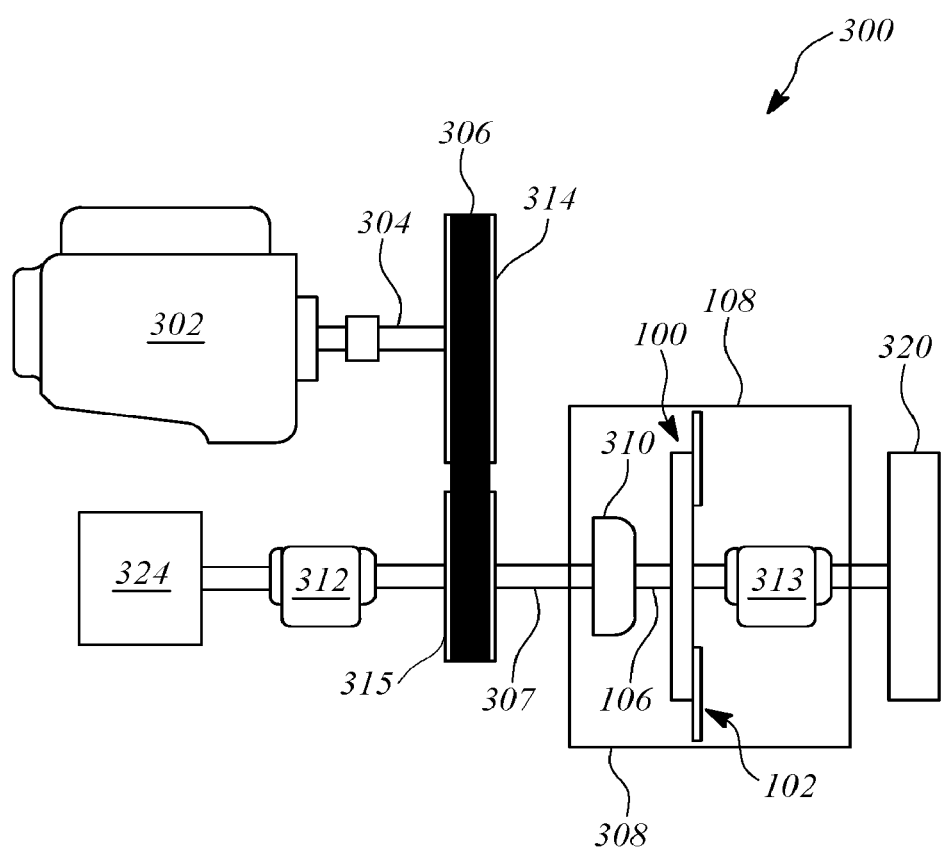
FIG. 3 is a schematic view of an apparatus having the wheel with the automatic centrifugal brakes, according to one or more embodiments of the present disclosure.

In one embodiment, the wheel 100 with the centrifugal braking assemblies 102 may be employed in an apparatus (an example of which is shown in FIG. 3) that may also include an engine 302 (shown in FIG. 3), and a rotatable shaft 106 operatively coupled to the engine.

The shaft 106 may be journaled within, and coaxial with, a cylinder 108. Cylinder 108 may have an inner wall 110 with an inner diameter "D1". In one embodiment, the shaft 106 may be operably coupled to a crankshaft 304 (shown in FIG. 3) of the engine 302 to receive rotational power therefrom.

The wheel 100 may be concentrically mounted on the shaft 106. Therefore, the wheel 100 may also be coaxial with the cylinder 108. The wheel 100 can have an outer diameter "D2". The inner diameter "D1" of the cylinder 108 may be greater than the outer diameter "D2" of the wheel 100. In one embodiment, the wheel 100 may interchangeably be referred to as "first wheel 100". In some embodiments, the wheel 100 may be a flywheel.

FIG. 3 illustrates a schematic view of an apparatus 300, according to some embodiments of the present disclosure. The apparatus 300 may include the engine 302, a crankshaft 304, a first pulley 314, a second pulley 315, a belt 306, a shaft 307, a first gearbox 312, one or more accessories 324, a transmission device 308 and a flywheel 320. The transmission device 308 may further include cylinder 108 (which may be an integral part of transmission device 308 or may be a component fixedly mounted within transmission device 308), a clutch 310, the shaft 106, the wheel 100, two or more centrifugal braking assemblies 102, and second gearbox 313. The wheel 100 may be concentrically mounted on the shaft 106, and the centrifugal braking assemblies 102 may be mounted within or on the wheel 100.

In some embodiments, the engine 302 may be an internal combustion engine. For example, the engine 302 may be a spark ignition engine or a compression ignition engine, such as a diesel engine, a homogeneous charge compression ignition engine, a reactivity controlled compression ignition engine, and other compression ignition engines known in the art. Further, the engine 302 may be configured to operate on fuels, such as gasoline, diesel fuel, biodiesel, alcohol, natural gas, and a combination thereof. Engine 302, in some embodiments, may be a DC or AC electric motor.

The engine 302 may include an engine block that may further include a plurality of cylinders within (not shown). In one embodiment, the cylinders may be arranged in various configurations including, but not limited to, an in-line configuration, a V-type configuration, a radial configuration, and a rotary configuration. Further, a piston may be slidably disposed within each of the cylinders to reciprocate between a corresponding top dead center (not shown) and a corresponding bottom dead center (not shown). The piston may further be connected to the crankshaft 304 via a connecting rod (not shown), transmitting the reciprocating motion of the piston into a rotary motion of the crankshaft 304.

In some embodiments, the crankshaft 304 may be operatively coupled to the first pulley 314 which may drive belt 306 which, in turn, may rotate the second pulley 315. The second pulley 315 may be concentrically mounted on shaft 307 such that rotation of the second pulley 315 may rotate shaft 307. The first pulley 314, second pulley 315 and belt 306 may be configured (by selecting the size of the two pulleys) to rotate shaft 307 at a rotational speed that may be greater or less than the rotational speed of the crankshaft 304. The shaft 307 may be operatively coupled to the first gearbox 312, which may be further coupled to the one or more accessories 324. In some embodiments, the shaft 307 may also be operatively coupled to the transmission device 308.

In some embodiments, clutch 310 may be configured to selectively couple the shaft 106 to the shaft 307. The shaft 106 may be operatively coupled to the second gearbox 313 which, in turn, may be operatively coupled to the flywheel 320.

Since the flywheel 320 is coupled to the second gearbox 313 in the transmission device 308, the flywheel 320 may also rotate. During rotation, the flywheel 320 may store rotational energy (angular kinetic energy) due to rotational moment of inertia. The flywheel 320 may be adapted to supply the rotational energy stored therein to various systems. In some embodiments, the flywheel 320 may be employed to maintain a constant angular velocity of shaft 307. In some embodiments, the flywheel 320 may be made of materials, such as aluminum, iron, steel, and carbon fiber.

In some embodiments, the one or more accessories 324 may include a generator for supplying power to an electric drive or other electric device. The generator may be an AC generator, a DC generator or any other type of electric generators known in the art. In some embodiments, the one or more accessories 324 may include a compressor for HVAC systems, a transmission system, a hydraulic pump or other device that may be used to perform a function using the rotational power received from the engine 302 and/or flywheel 320. In some embodiments, the second pulley 315 may include a clutch mechanism that may enable connecting or disconnecting the pulley from the shaft 307, so when the engine is turned off (for example, to meet an anti-idle regulation), the energy from flywheel 320 may still be communicated through the center of the second pulley 315 to the first gearbox 312, and then to the one or more accessories 324.

Further, the centrifugal braking assemblies 102 may be mounted in or on the wheel 100 for limiting a rotational speed of the wheel 100 and the flywheel 320. The centrifugal braking assemblies 102 may be uniformly distributed on the wheel 100 in a circumferential direction. Each of the centrifugal braking assemblies 102 may be adapted to operate in the first operational mode and a second operational mode. In the first operational mode, a centrifugal braking assembly 102 may be adapted to disengage from the cylinder 108. On the other hand, in the second operational mode, the centrifugal braking assembly 102 may be adapted to engage with the cylinder 108.

Referring again to FIG. 1, for the sake of clarity, in the present embodiment, two centrifugal braking assemblies 102, individually referred to as "centrifugal braking assembly 102-1" and "centrifugal braking assembly 102-2" as shown, are mounted on the wheel 100. However, more than two centrifugal braking assemblies 102 may be mounted on the wheel 100 based on various factors. Such factors may include, but are not limited to, a size of a braking surface between each of the centrifugal braking assemblies 102 and the cylinder 108, and the breaking force necessary to limit the rotational speed of flywheel 320.

In FIG. 1, the centrifugal braking assembly 102-1 and the centrifugal braking assembly 102-2 may be in the first operational mode, i.e., disengaged from the cylinder 108. The centrifugal braking assembly 102-1 may include a brake member 112-1, a cam 114-1 in slidable contact with the brake member 112-1, and a spring 116-1 connected between the cam 114-1 and a first pin 118-1 mounted on the wheel 100. The brake member 112-1 may further include a proximal end 120-1 and a distal end 122-1. At the proximal end 120-1, the brake member 112-1 may be pivotally mounted on the wheel 100 about the first pin 118-1. At the distal end 122-1, the brake member 112-1 may include at least one curved friction surface 124-1.

Further, the cam 114-1 may include a first end 126-1 and a second end 128-1 distal to the first end 126-1. At the first end 126-1, the cam 114-1 may be pivotally mounted on the wheel 100 about a second pin 130-1. The cam 114-1 may be positioned with respect to the brake member 112-1 to establish the slidable contact with the brake member 112-1 limiting the movement of the brake member 112-1 in the first operational mode. Further, the spring 116-1 may be connected between the second end 128-1 of the cam 114-1 and the first pin 118-1 mounted on the wheel 100. In particular, at the second end 128-1, the spring 116-1 may be connected to a third pin 132-1 that may be adapted to restrain the pivotal movement of the cam 114-1. In one embodiment, the spring 116-1 may be a coil spring.

Similarly, the centrifugal braking assembly 102-2 may include a brake member 112-2, a cam 114-2 in slidable contact with the brake member 112-2, and a spring 116-2 connected between the cam 114-2 and a first pin 118-2 mounted on the wheel 100. The brake member 112-2 may include a proximal end 120-2 and a distal end 122-2. At the proximal end 120-2, the brake member 112-2 may be pivotally mounted on the wheel 100 about the first pin 118-2. Further, at the distal end 122-2, the brake member 112-2 may include a curved friction surface 124-2.

In one embodiment, the cam 114-2 may include a first end 126-2 and a second end 128-2 distal to the first end 126-2. At the first end 126-2, the cam 114-2 may be pivotally mounted on the wheel 100 about a second pin 130-2. The cam 114-2 may be positioned with respect to the brake member 112-2 to establish the slidable contact with the brake member 112-2 limiting the movement of the brake member 112-2 in the first operational mode. Further, the spring 116-2 may be connected between the second end 128-2 of the cam 114-2 and the first pin 118-2 mounted on the wheel 100. In particular, at the second end 128-2, the spring 116-2 may be connected to a third pin 132-2 that may be adapted to restrain the pivotal movement of the cam 114-2. In one embodiment, the spring 116-2 may be a coil spring.

In one embodiment, the brake member 112-1 and the brake member 112-2 may collectively be referred to as "brake members 112". Similarly, the cam 114-1 and the cam 114-2 may collectively be referred to as "cams 114". In one embodiment, several stoppers 134 may be mounted on the wheel 100 for restricting movements of the brake members 112 and the cams 114. As shown, the stoppers 134 may be disposed around each of the brake members 112 and the cams 114. The stoppers 134 may individually be referred to as "stopper 134-1", "stopper 134-2", "stopper 134-3", and "stopper 134-n". In one embodiment the stoppers 134 may restrict movement of the brake members 112 and the cams 114 when the centrifugal braking assemblies 102 are in the first operational mode.

Figure 2:
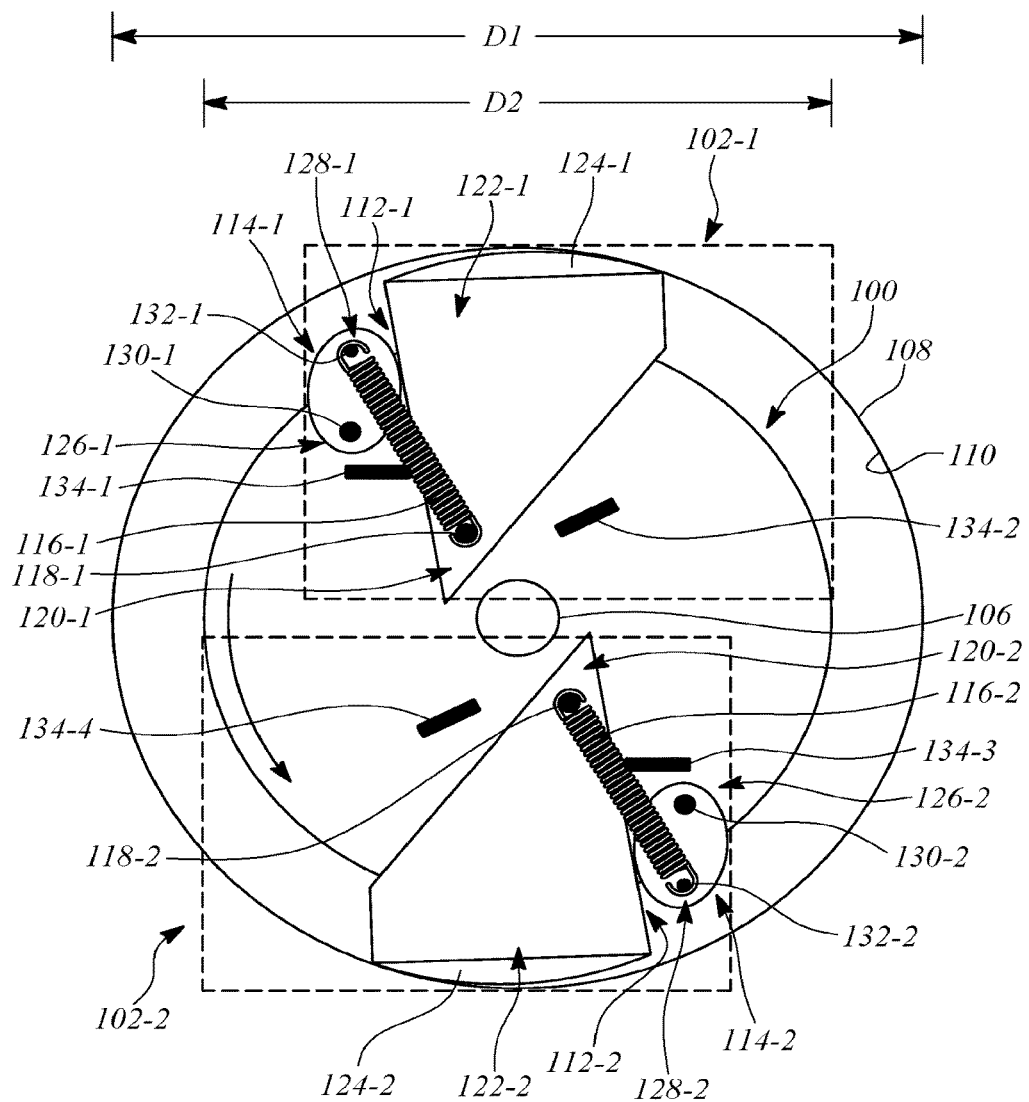
FIG. 2 is a schematic view of the wheel with the automatic centrifugal brakes in a second operational mode, according to one or more embodiments of the present disclosure.

FIG. 2 illustrates a schematic view of the wheel 100 with the centrifugal braking assemblies 102 in the second operational mode, according to one or more embodiments of the present disclosure. In the present embodiment, the wheel 100 is shown to be rotating in an anticlockwise direction. For the sake of brevity, details of the centrifugal braking assemblies 102 in FIG. 2 are explained with respect to the centrifugal braking assembly 102-1. A person skilled in the art appreciates that such details of the centrifugal braking assembly 102-1 are equally applicable to the centrifugal braking assembly 102-2, without departing from the scope of the present disclosure.

In the second operational mode, the centrifugal braking assembly 102-1 may engage with the cylinder 108. By engaging with the cylinder 108 that is stationary, the centrifugal braking assembly 102-1 may reduce the rotational speed of the wheel 100 or may completely stop the wheel 100 from rotating. In one embodiment, the centrifugal braking assembly 102-1 may switch between the first operational mode and the second operational mode, based on the rotational speed of the shaft 106.

In one embodiment, when the rotational speed of the shaft 106 exceeds a first predetermined value, the centrifugal braking assembly 102-1 may switch from the first operational mode to the second operational mode, i.e., may engage with the cylinder 108. In one embodiment, the first predetermined value may be determined based on parameters including, but not limited to, a mass of the brake member 112-1, a distribution of the mass of the brake member 112-1, a shape of the brake member 112-1, mass and shape of the cam 114-1, a spring rate of the spring 116-1, positions of the cam 114-1, the brake member 112-1, and the stoppers 134, a distance between the outer diameter "D2" of the wheel 100 and the inner diameter "D1" of the cylinder 108, and friction between the brake member 112-1 and the cam 114-1.

In particular, the brake member 112-1, the cam 114-1, and the spring 116-1 may cooperate to rotate the curved friction surface 124-1 of the brake member 112-1 into contact with the inner wall 110 of the cylinder 108. In one embodiment, as the rotational speed of the shaft 106 exceeds the first predetermined value, the brake member 112-1 may extend out to engage with the inner wall 110 whereas the cam 114-1 and the spring 116-1 may provide resistive force to the brake member 112-1. For example, to engage the brake member 112-1 with the cylinder 108, the cam 114-1 and the brake member 112-1 may perform a rotational movement in the anti-clockwise direction. While performing the rotational movement in the anti-clockwise direction, the curved friction surface 124-1 of the brake member 112-1 may contact the inner wall 110 thereby braking the wheel 100.

Therefore, centrifugal forces acting on the brake member 112-1 and the cam 114-1 result in engagement of the brake member 112-1 with the cylinder 108. In one embodiment, an extent of the engagement of the curved friction surface 124 may depend on the rotational speed of the shaft 106 and the centrifugal forces acting on the brake member 112-1 and the cam 114-1.

In one embodiment, the curved friction surface 124-1 of the brake member 112-1 may remain engaged with the inner wall 110 of the cylinder 108 until the rotational speed of the shaft 106 drops below a second predetermined threshold. Once the rotational speed of the shaft 106 drops below the second predetermined threshold, the curved friction surface 124-1 may get disengaged from the inner wall 110. Therefore, the centrifugal braking assembly 102-1 may automatically reset by retracting the curved friction surface 124-1 of the brake member 112-1 from the cylinder 108. In one embodiment, in order to reset the centrifugal braking assembly 102-1, the spring 116-1 may pull and the cam 114-1, which, in turn, may pull the brake member 112-1 away from the inner wall 110 resulting in disengagement from the cylinder 108.

In one embodiment, the centrifugal braking assembly 102-1 and the centrifugal braking assembly 102-2 may switch between the first operational mode and the second operational mode independent of each other. For example, the centrifugal braking assembly 102-1 may be operating in the first operational mode and the second centrifugal braking assembly 102-2 may be operating in the second operational mode. Therefore, at the same time, the centrifugal braking assembly 102-1 may be disengaged from the cylinder 108 whereas the centrifugal braking assembly 102-2 may be engaged with the cylinder 108.

Figure 4:
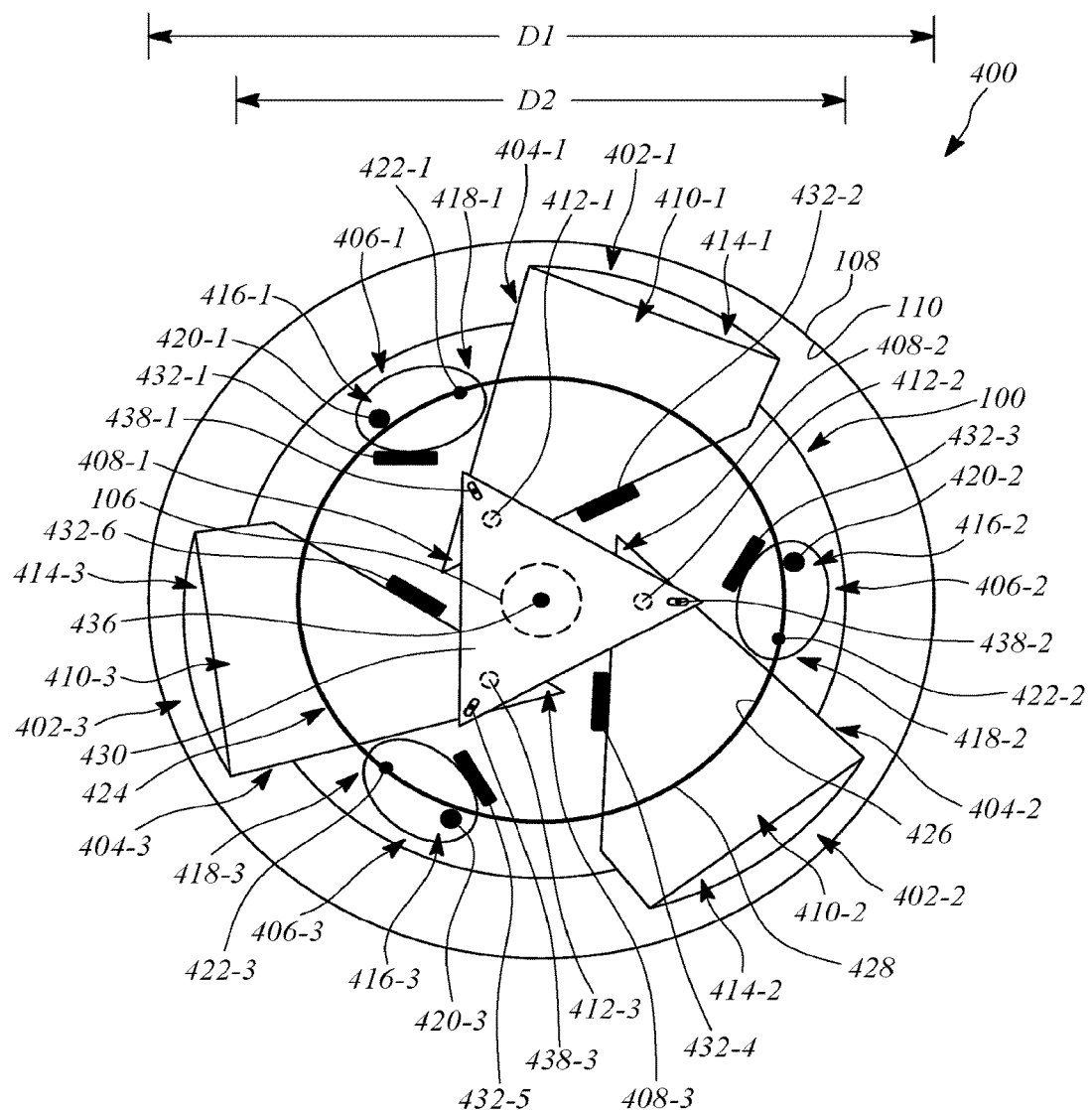
FIG. 4 is a schematic view of the wheel with the automatic centrifugal brakes, according to one or more embodiments of the present disclosure.

FIG. 4 illustrates a schematic view of a portion of an apparatus 400 with centrifugal braking assemblies 402, according to one or more embodiments of the present disclosure. The apparatus 400 may also include or encompass the cylinder 108, the engine 302, the shaft 106, the wheel 100, the crankshaft 304 as explained for the apparatus 300, without departing from the scope of the present disclosure.

In the present embodiment, three centrifugal braking assemblies 402 may be mounted on the wheel 100. The three centrifugal braking assemblies 402 may individually be referred to as "centrifugal braking assembly 402-1", "centrifugal braking assembly 402-2", and "centrifugal braking assembly 402-3".

The centrifugal braking assembly 402-1 may include a brake member 404-1 and a cam 406-1 in slidable contact with the brake member 404-1. The brake member 404-1 may further include a proximal end 408-1 and a distal end 410-1. At the proximal end 408-1, the brake member 404-1 may be pivotally mounted on the wheel 100 about a first pin 412-1. At the distal end 410-1, the brake member 404-1 may include a curved friction surface 414-1.

Further, the cam 406-1 may include a first end 416-1 and a second end 418-1 distal to the first end 416-1. At the first end 416-1, the cam 406-1 may be pivotally mounted on the wheel 100 about a second pin 420-1. The cam 406-1 may be positioned with respect to the brake member 404-1 to establish the slidable contact with the brake member 404-1 limiting the movement of the brake member 404-1 in the first operational mode. At the second end 418-1, a third pin 422-1 may be mounted on the cam 406-1 to restrain, with cooperation of spring ring 424, the pivotal movement of the cam 406-1.

Similarly, the centrifugal braking assembly 402-2 may include a brake member 404-2 and a cam 406-2 in slidable contact with the brake member 404-2. The brake member 404-2 may further include a proximal end 408-2 and a distal end 410-2. At the proximal end 408-2, the brake member 404-2 may be pivotally mounted on the wheel 100 about a first pin 412-2. At the distal end 410-2, the brake member 404-2 may include a curved friction surface 414-2.

Further, the cam 406-2 may include a first end 416-2 and a second end 418-2 distal to the first end 416-2. At the first end 416-2, the cam 406-2 may be pivotally mounted on the wheel 100 about a second pin 420-2. The cam 406-2 may be positioned with respect to the brake member 404-2 to establish the slidable contact with the brake member 404-2 limiting the movement of the brake member 404-2 in the first operational mode. At the second end 418-2, a third pin 422-2 may be mounted on the cam 406-2 to restrain, with cooperation of spring ring 424, the pivotal movement of the cam 406-2.

In one embodiment, the centrifugal braking assembly 402-3 may include a brake member 404-3 and a cam 406-3 in slidable contact with the brake member 404-3. The brake member 404-3 may further include a proximal end 408-3 and a distal end 410-3. At the proximal end 408-3, the brake member 404-3 may be pivotally mounted on the wheel 100 about a first pin 412-3. At the distal end 410-3, the brake member 404-3 may include a curved friction surface 414-3.

Further, the cam 406-3 may include a first end 416-3 and a second end 418-3 distal to the first end 416-3. At the first end 416-3, the cam 406-3 may be pivotally mounted on the wheel 100 about a second pin 420-3. The cam 406-3 may be positioned with respect to the brake member 404-3 to establish the slidable contact with the brake member 404-3 limiting the movement of the brake member 404-3 in the first operational mode. At the second end 418-3, a third pin 422-3 may be mounted on the cam 406-3 to restrain, with cooperation of spring ring 424, the pivotal movement of the cam 406-3.

In one embodiment, the brake member 404-1, the brake member 404-2, and the brake member 404-3 may collectively be referred to as "brake members 404". The cam 406-1, the cam 406-2, and the cam 406-3 may collectively be referred to as "cams 406". Further, the second pin 420-1, the second pin 420-2, and the second pin 420-3 may collectively be referred to as "second pins 420". Similarly, the third pin 422-1, the third pin 422-2, and the third pin 422-3 may collectively be referred to as "third pins 422". In one embodiment, the curved friction surface 414-1, the curved friction surface 414-2, and the curved friction surface 414-3 may collectively be referred to as "curved friction surfaces 414".

In the present embodiment, the apparatus 400 may include a spring ring 424 having an inner surface 426 and an outer surface 428 distal to the inner surface 426. The spring ring 424 may be mounted on the brake members 404 and the cams 406 in such a manner that the inner surface 426 of the spring ring 424 remain in contact with the third pins 422. The spring ring 424 may be adapted to connect and balance the action of the cams 406 of the centrifugal braking assemblies 402 with each other.

In some embodiments, the centrifugal braking assembly 402-1, the centrifugal braking assembly 402-2, and the centrifugal braking assembly 402-3 may be linked with each other through a connective linkage 430. The connective linkage 430 may include three slots that locate connective linkage 430 over pins 438-1, 438-2, and 438-3, each pin being fixedly attached to respective brake members 404-1, 404-2, and 404-3. Further, in embodiments where apparatus 400 may be mounted at the end of shaft 106, connective linkage 430 may be pivotally coupled to a pin 436 fixedly attached to the end of shaft 106. In an alternative embodiment, where apparatus 400 may be mounted at a central portion of shaft 106, connective linkage 430 may include a hole large enough to allow connective linkage 430 to pivot around the circumference of shaft 106. In such embodiments, the connective linkage 430 may be arranged to balance operation of the centrifugal braking assemblies 402. In alternative embodiments, in place of slots to engage pins 438-1, 438-2, and 438-3, connective linkage 430 may be reduced in size and may include additional linkage elements that tie connective linkage 430 to each of the pins 438-1, 438-2, and 438-3.

In some embodiments, when the rotational speed of the shaft 106 exceeds a first predetermined value, the brake members 404, the cams 406, and the spring ring 424 may cooperate to rotate the curved friction surfaces 414 of the brake members 404 into contact with the inner wall 110 of the cylinder 108. Therefore, the centrifugal braking assemblies 402 switch from the first operational mode to the second operational mode by engaging with the inner wall 110 of the cylinder 108. Further, when the rotational speed of the shaft 106 may drop below the second predetermined threshold, the curved friction surfaces 414 may disengage from the inner wall 110. Therefore, the centrifugal braking assemblies 402 switch back from the second operational mode to the first operational mode.

In one embodiment, the apparatus 300 may include a plurality of stoppers 432 mounted on the wheel 100 for restricting movements of the brake members 404 and the cams 406. As shown, each of the stoppers 432 may be disposed around each of the brake members 404 and the cams 406. The stoppers 432 may individually be referred to as "stopper 432-1", "stopper 432-2", "stopper 432-3", . . . and "stopper 432-n".

INDUSTRIAL APPLICABILITY

The present disclosure relates to an apparatus 300, such as that illustrated in FIG. 3, having centrifugal braking assemblies mounted on one or more wheels or flywheels, according to one or more embodiments of the present disclosure. In one embodiment, the apparatus 300 may be disposed in a machine (not shown) that is employed in industries, such as mining, quarrying, construction, and site preparation. Such machines may include, but are not limited to, on-highway machines, off-highway machines, earth moving equipment, generators, aerospace machines, locomotives, marine craft and equipment, or any other engine or motor driven components used in various applications. Further, the machine may be a manually operated machine, an autonomous machine, or a machine that is operable in both manual and autonomous mode.

In order to avail the functionalities of the apparatus 300, the centrifugal braking assemblies may be mounted on the wheels or flywheels of an already existing drive train of any machine. The already existing components of the machine may demand minimal modification for accommodating the centrifugal braking assemblies as disclosed herein.

The apparatus 300 of the present disclosure offers the centrifugal braking assemblies mounted on at least one of the wheels for eliminating the possibility of failure of at least one of the wheels by controlling the rotational speed of the wheels and therefore, of the shafts. Usually, over-speeding of the wheels indicates that either the engine has over-sped or the clutch between the engine and the wheel has failed, or both. The apparatus 300 of the present disclosure provides another level of protection, such as, the centrifugal braking assemblies that may be adapted to passively engage in case of over-speeding of the wheels.

Further, a braking power of the centrifugal braking assemblies as disclosed increases with the square of the rotational speed in such a manner that the braking power may compensate for the capacity of a clutch, in case the clutch fails in an engaged state. For example, in some embodiments the braking torque capacity of braking assemblies 102 exceeds the torque capacity of clutch 310, so with engagement of braking assemblies 102, clutch 310 will slip. Therefore, in case of over-speeding of the engine and the failure of the clutch disengagement, the centrifugal braking assemblies may provide resistance to first brake the wheels, and then break the shafts, if required, for example, when the wheels have over-sped beyond a threshold.

Also, the centrifugal braking assemblies disclosed herein may be adapted to automatically engage with a cylinder once the rotational speed of the shaft exceeds the first predetermined value. Similarly, when the rotational speed of the shaft drops below the second predetermined threshold, the centrifugal braking assemblies may be adapted to automatically disengage from the cylinder. Therefore, manual intervention is minimized, for example, for operating the centrifugal braking assemblies between the first operational mode and the second operational mode.

The efficiency of the wheel in terms of energy storage is also significantly improved. Moreover, since the centrifugal braking assemblies disclosed herein may be mounted on either a shaft directly connected to an engine or, alternatively, to a shaft that has been geared down from the engine shaft, there is flexibility in terms of application and scope of the apparatus 300. Further, as the centrifugal braking assemblies disclosed herein may be mounted on a shaft that has been geared down from the engine shaft (rotates slower than the engine shaft), brake parts with lower tolerance in comparison to brake parts to be used in case of mounting on the engine shaft with higher speed may be manufactured and used. Therefore, the present disclosure offers the apparatus 300 having the centrifugal braking assemblies mounted on the wheels that are compact, simple, effective, economical, and flexible.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An apparatus comprising:
    an engine;
    a device having at least one cylindrical section having a stationary inner wall with an inner diameter;
    a rotatable shaft operatively connected to the engine, journaled within and coaxial with the at least one cylindrical section of the device;
    a wheel, having an outer diameter, concentrically mounted on the shaft, wherein the inner diameter of the stationary inner wall of the at least one cylindrical section of the device is greater than the outer diameter of the wheel; and
    at least two centrifugal braking assemblies mounted on the wheel uniformly distributed in the circumferential direction,
    wherein each said centrifugal braking assembly includes:
        a brake member pivotally mounted on the wheel at a proximal end and having at least one curved friction surface at a distal end,
        a cam pivotally mounted on the wheel at a first end and in slidable contact with the brake member, and
        a spring connected between a second end of the cam and a pin mounted on the wheel, and
    wherein each brake member, each cam, and each spring are configured to cooperate to rotate each at least one curved friction surface of each brake member into contact with the stationary inner wall of the at least one cylindrical section of the device when a rotational speed of the rotatable shaft exceeds a first predetermined value without rotating the inner wall of the at least one cylindrical section.

2. The apparatus of claim 1, wherein the wheel is a flywheel.

3. The apparatus of claim 1, wherein each said centrifugal braking assembly is configured to automatically reset when the rotational speed of the rotatable shaft drops below a second predetermined value.

4. The apparatus of claim 3, wherein each said centrifugal braking assembly is configured to automatically reset by retracting each at least one curved friction surface of each brake member from the stationary inner wall of the at least one cylindrical section.

5. The apparatus of claim 1, wherein the spring is a coil spring.

6. The apparatus of claim 1, wherein the at least two centrifugal braking assemblies are connected through at least one connective linkage.

7. The apparatus of claim 1, wherein each at least one curved friction surface of each brake member is configured to contact the stationary inner wall of the at least one cylindrical section of the device so as to decrease, but not stop, the rotational speed of the rotatable shaft.

8. The apparatus of claim 1, wherein each at least one curved friction surface of each brake member is configured to contact the stationary inner wall of the at least one cylindrical section of the device so as to stop the rotational speed of the rotatable shaft.

9. The apparatus of claim 1, wherein the first predetermined value of the shaft using a first one of the at least two centrifugal braking assemblies is different from the first predetermined value of the shaft using a second one of the at least two centrifugal braking assemblies.

10. The apparatus of claim 1, wherein a first one of the at least two centrifugal braking assemblies contacts the stationary inner wall of the at least one cylindrical section of the device when a second one of the at least two centrifugal braking assemblies is not in contact with the stationary inner wall of the at least one cylindrical section of the device.

11. An apparatus comprising:
    a shaft;
    a wheel, having an outer diameter, concentrically mounted on the shaft;
    a cylinder, coaxial with the wheel and having a stationary inner wall with an inner diameter, wherein the inner diameter of the stationary inner wall of the cylinder is greater than the outer diameter of the wheel; and
    at least two centrifugal braking assemblies mounted on the wheel uniformly distributed in the circumferential direction,
    wherein each said centrifugal braking assembly includes:
        a brake member pivotally mounted on the wheel at a proximal end and having at least one curved friction surface at a distal end,
        a cam pivotally mounted on the wheel at a first end and in slidable contact with the brake member,
        a spring connected between a second end of the cam and a pin mounted on the wheel, and
    wherein each brake member, each cam, and each spring are configured to cooperate to rotate each at least one curved friction surface of each brake member into contact with the stationary inner wall of the cylinder when a rotational speed of the shaft exceeds a first predetermined value without rotating the stationary inner wall of the cylinder.

12. The apparatus of claim 11, wherein the wheel is a flywheel.

13. The apparatus of claim 11, wherein each said centrifugal braking assembly is configured to automatically reset when the rotational speed of the shaft drops below a second predetermined value.

14. The apparatus of claim 13, wherein each said centrifugal braking assembly is configured to automatically reset by retracting each at least one curved friction surface of each brake member from the stationary inner wall of the at least one cylinder.

15. The apparatus of claim 11, wherein the spring is a coil spring.

16. The apparatus of claim 11, wherein the at least two centrifugal braking assemblies are connected through at least one connective linkage.

17. The apparatus of claim 11, wherein each at least one curved friction surface of each brake member is configured to contact the stationary inner wall of the cylinder so as to decrease, but not stop, the rotational speed of the shaft.

18. The apparatus of claim 11, wherein each at least one curved friction surface of each brake member is configured to contact the stationary inner wall of the cylinder so as to stop the rotational speed of the shaft.

19. The apparatus of claim 11, wherein the first predetermined value of the shaft using a first one of the at least two centrifugal braking assemblies is different from the first predetermined value of a second one of the at least two centrifugal braking assemblies.

20. The apparatus of claim 11, wherein a first one of the at least two centrifugal braking assemblies contacts the stationary inner wall of the cylinder when a second one of the shaft using the at least two centrifugal braking assemblies is not in contact with the stationary inner wall of the cylinder.

* * * * *